April 17, 1928.  1,666,576
R. W. LYTLE
SILENT GEAR AND METHOD OF MANUFACTURE
Filed Feb. 5, 1925   2 Sheets-Sheet 2
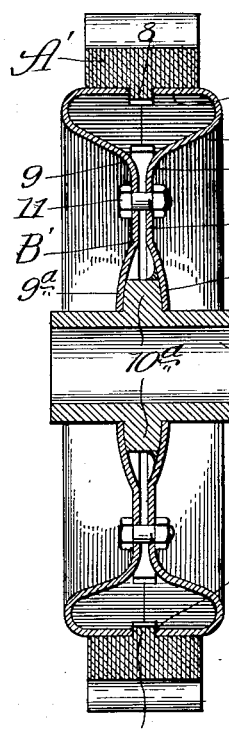
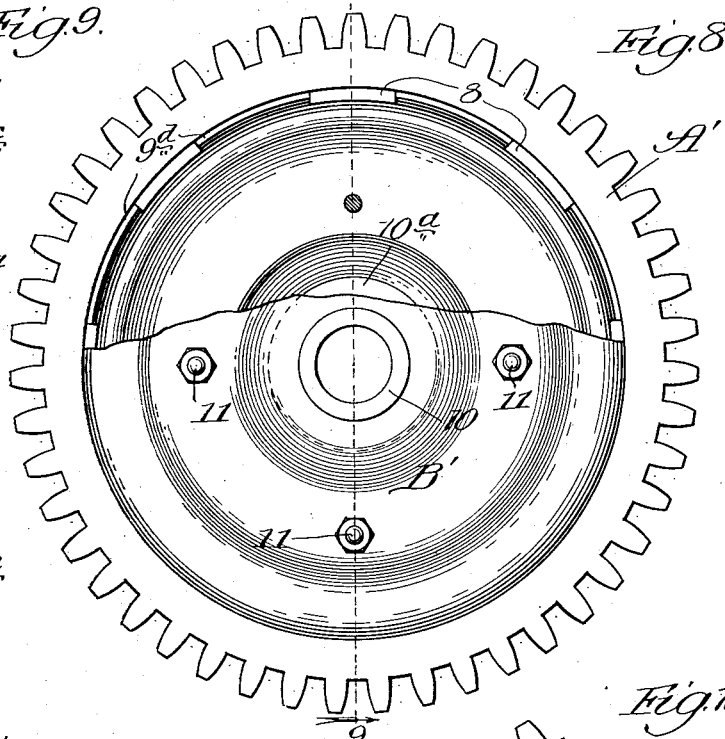
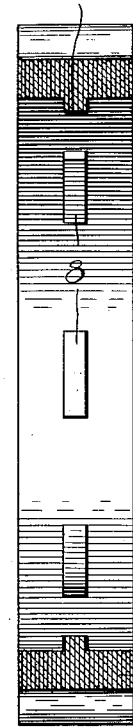
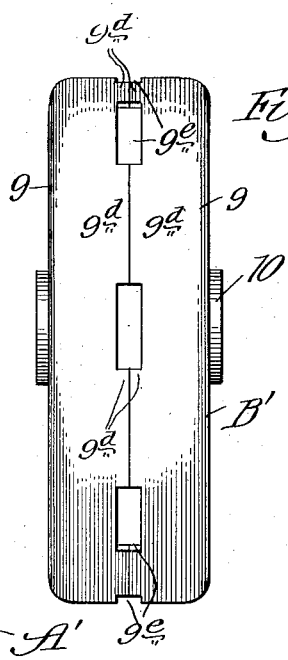
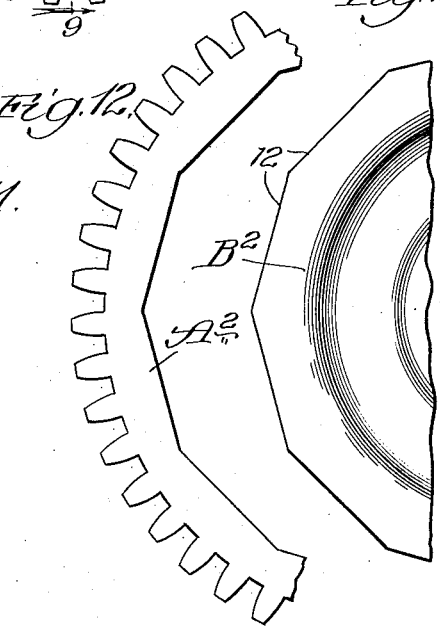

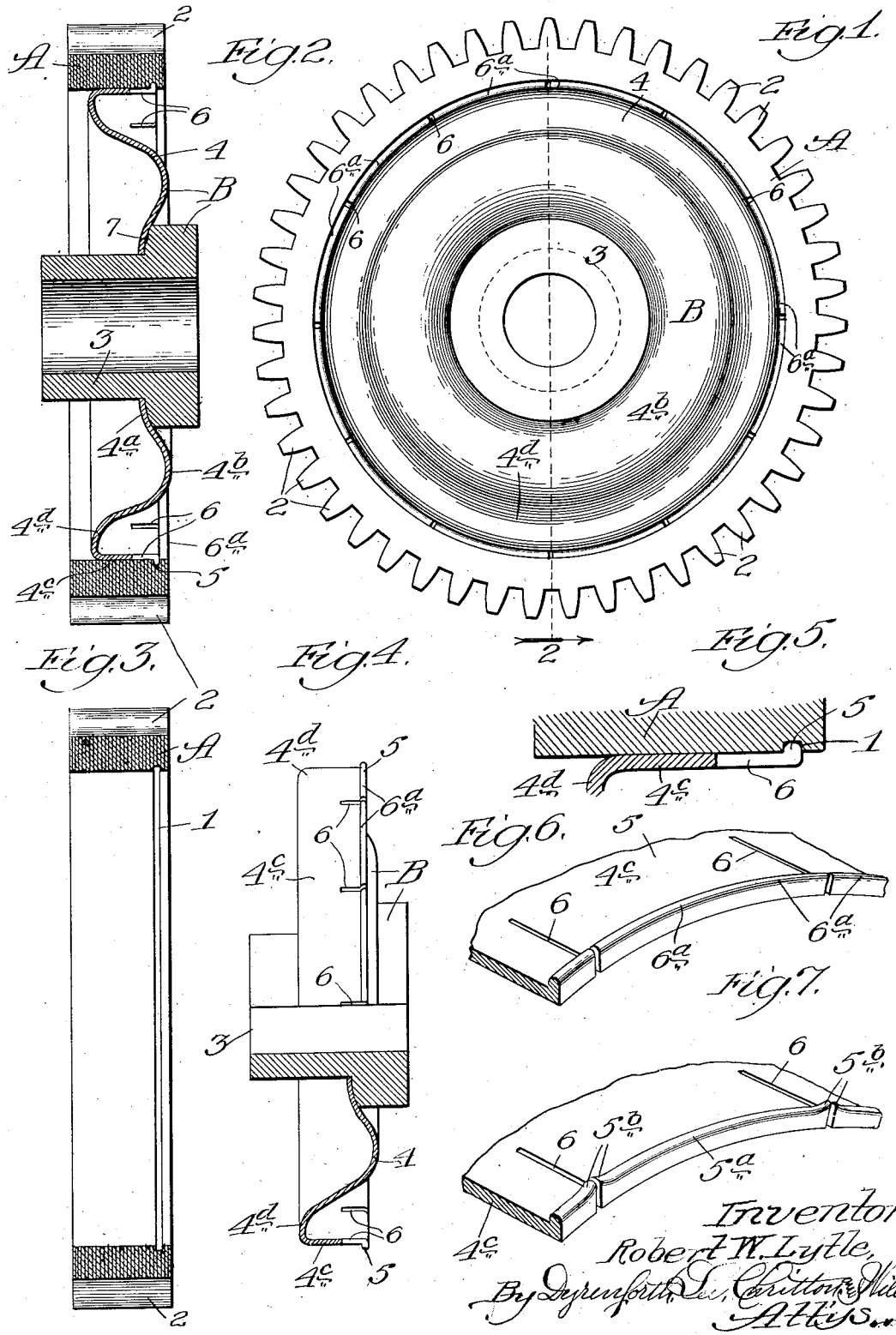

Patented Apr. 17, 1928.

1,666,576

UNITED STATES PATENT OFFICE.

ROBERT W. LYTLE, OF CINCINNATI, OHIO, ASSIGNOR TO THE FORMICA INSULATION COMPANY, OF CINCINNATI, OHIO, A CORPORATION OF OHIO.

SILENT GEAR AND METHOD OF MANUFACTURE.

Application filed February 5, 1925. Serial No. 7,176.

This invention relates particularly to gearwheels of the silent gear type having nonmetallic teeth. Such gears are at the present time manufactured from various non-metallic substances. A laminated product composed of cloth, or canvas, and impregnated with a varnish of bakelite, Redmanol, or the like, the mass being compacted and hardened under heat and pressure, is well adapted for use in the manufacture of silent gears. Such a material is expensive, however.

The primary object of this invention is to provide an improved silent gear and an improved method of making the same. In the improved gear, use is preferably made of a ring, or annulus, of laminated product comprising layers of cloth impregnated with bakelite varnish, for example, and compacted and hardened under heat and pressure. Among products of this kind now on the market may be mentioned Formica and Micarta.

In accordance with the present invention, a ring of suitable material, such as the laminated product known as Formica is provided with a resilient metal center which is so formed as to compensate for the different coefficients of expansion which these materials possess. In this connection, it may be stated that a laminated material comprising canvas and a phenolic condensation product has a coefficient of expansion which is approximately twice as great as that of metals commonly used for gear purposes; hence, it becomes important in seeking to properly construct a gear which has the rim and teeth formed of such product and which has the center formed of metal, to make provision for a compensating factor which will insure a secure connection between the metal center and the toothed ring at all times. In the present invention, a sheet-metal center having annular corrugations is employed between the annulus and the hub.

The invention is illustrated in preferred embodiments in the accompanying drawings, in which—

Fig. 1 represents a side elevational view of a gear constructed in accordance with the invention, such a gear being well adapted to light-duty work, as for example, in a timing gear train of an automobile; Fig. 2, a sectional view taken as indicated at line 2 of Fig. 1; Fig. 3, a sectional view of the toothed ring; Fig. 4, a view partly in section and partly in elevation of the metal center; Fig. 5, an enlarged broken sectional view illustrating more clearly the manner in which the rim portion of the metal center engages the inner surface of the toothed ring; Fig. 6, a broken perspective view of the outer flange of the metal center; Fig. 7, a similar perspective view showing a slight modification of the flange; Fig. 8, an elevational view of a modified form of the improved gear, such form being adapted to relatively heavy duty, this view showing one of the sheet-metal disks brokenly; Fig. 9, a sectional view taken as indicated at line 9 of Fig. 8; Fig. 10, a sectional view of the toothed ring employed in this modification; Fig. 11, an elevational view of the metal center; Fig. 12, a broken side elevational view of a toothed ring of modified form; and Fig. 13, a broken elevational view of a metal center of modified form.

Referring to the construction shown in Figs. 1 to 6, inclusive, A designates a toothed ring comprising fibrous material and a suitable binder, such as the laminated Formica product mentioned above; and B designates a metal center upon which the toothed ring is mounted.

The toothed ring A may be applied to the center in any desired way. It is preferred to provide the ring with an internal annular groove 1 which is near one lateral face of the ring, and to press the metal center into the toothed ring and cause it to become properly engaged therewith. The ring A may be formed, for example, by impregnating annular sheets of canvas with potentially reactive Redmanol varnish, drying the sheets, stacking them in superposed relation, and subjecting the stack of material to pressure in a heated press until the Redmanol is converted to the final infusible and substantially insoluble condition. The groove 1 may be cut in the annulus after it has been formed in the manner stated; or, the dies in which the ring is pressed may be suitably formed to produce the groove. The teeth 2 preferably are produced by a milling operation. This may be done either before or after the metal center has been introduced into the ring.

The metal center B preferably comprises a central bushing 3, and a disk 4 of sheet steel, or other suitable sheet-metal, produced by a rolling process. The disk is subjected to a forming operation which has the effect of drawing the metal into curves and shortening the radius of the disk. Thus, the disk, in the illustration given, is provided with a perforate central portion 4ª which receives the bushing 3, an annular dished portion 4ᵇ which encircles the portion 4ª, and a peripheral flange 4ᶜ which is joined to the curved portion 4ᵇ by an intervening curve 4ᵈ. The flange 4ᶜ is substantially parallel with the axis. It is provided at its free edge with an outturned rudimentary flange, or lip, 5, which engages the groove 1. The flange 4ᶜ is further provided with a series of suitably spaced slits 6 which also cut the lip 5. This provides the flange 4ᶜ with sectors 6ª which enable the flange 5 to slip more readily into engagement with the annular groove 1. The central portion 4ª of the disk may be forced onto the bushing 3, and may be further secured to the bushing in any suitable manner, as by spot-welding at 7.

If desired, the ring A may be molded directly upon the flange of the disk 4. It is preferred, however, to form the ring A and the disk 4 independent of each other, and then press them into engagement under heavy pressure.

In the modification shown in Fig. 7, the flange portion 4ᶜ of the disk 4 is provided with a lip 5ª of modified form. In this modification, the flange 5ª is provided with enlargements 5ᵇ which are adapted to be pressed into the fibre of the ring A, thus providing anchors which will serve to prevent any possible relative rotation between the ring A and the metal disk. Thus, the disk will be held under resilient compression and will expand, when necessary, to compensate for any enlargement of the ring A due to heat.

From the description given, it will be noted that a section through the disk 4 along a radial plane discloses folds in the metal, so that the distance between the hub, or bushing, 3, and the ring A is much greater than would be presented by a flat disk, for example.

In the modification shown in Figs. 9 to 11, inclusive, A′ represents the toothed ring; and B′ represents the pressed metal center. In this case, the toothed ring is provided internally with a series of lugs 8; and the metal center B′ comprises two pressed metal disks 9 which are similar, but which are reversed with respect to each other. The disks 9 are mounted on a bushing, or hub, 10, which is provided externally with a central flange 10ª. Each disk 9 has a central portion 9ª, an intermediate portion 9ᵇ, and a curved portion 9ᶜ which terminates in an inturned flange 9ᵈ. The flanges 9ᵈ are provided with complemental notches 9ᵉ which embrace the lugs 8. The disks 9 are forced onto the bushing 10 under pressure, and may be additionally secured thereon in any suitable manner. The disks may be connected at their intermediate portions by an annular series of bolts 11. It will be noted that the disks 9 are pressed into such form as to provide an excess of metal along radial planes. That is, the metal is, in effect, provided with folds which are produced by the dies, these folds being in the general nature of annular corrugations.

The sheet-metal employed is stiff, but resilient; and the curvatures of the metal provide for increased resilience, the disks being thus in the nature of springs. Thus, the disks are adapted to serve as shock absorbers, so that the shocks produced by heavy blows or stresses imparted to the gear teeth will be largely absorbed by the sheet-metal center.

A gear of the construction shown in Figs. 9 to 10, inclusive, is adapted to relatively heavy duty.

In the modification shown in Fig. 12, $A^2$ represents a toothed annulus which may be composed of Formica, or the like; and $B^2$ represents a sheet-metal disk. The disk $B^2$ may be provided with concentric curves like the previously described cases. In the modification, the disk (or disks) is provided with a polygonal peripheral surface 12 which conforms to a similar interior surface with which the annulus $A^2$ is provided. The parts may be assembled by any suitable expedient, as will be readily understood. This form of a connection between the annulus and the sheet-metal center provides against any relative displacement of the parts by reason of torque transmitted in a driving action.

The improved gear can be manufactured at moderate cost. It allows the use of Formica, Micarta, or other expensive laminated material, to be reduced to the lowest safe minimum, it being necessary to retain only a sufficient cross-section of the laminated material to withstand any stresses which may be imparted to the gear. Also, a gear of this construction is more resilient and better adapted to dissipate shocks than constructions hitherto known.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A gear comprising an annulus of compacted and hardened fibre and a binder, a central bushing, and a corrugated sheet-metal disk held under radial compression between said bushing and said annulus and equipped with a slitted flange, said flange having interlocking connection with said annulus.

2. A gear comprising a compacted and hardened annulus of fibre and a binder, said annulus being provided with an internal groove, and a metal center comprising a sheet-metal disk having folds therein and provided at its periphery with means interlockingly engaging said groove.

3. A gear comprising an annulus of Formica, or the like, a central bushing, and a dished, corrugated disk interposed between said bushing and said annulus and having a flange engaging the internal surface of said annulus and interlockingly connected therewith.

4. The method of forming a gear, which comprises: forming an annulus of compacted and hardened fibrous material and a phenolic condensation product and providing said annulus with an interior groove; forming a sheet-metal disk with annular corrugations therein and providing said disk with a peripheral flange having means for interlockingly engaging said groove; and pressing said disk into the space within said annulus and bringing the parts into interlocking engagement.

5. A gear comprising an annulus composed of fibrous material and a binder, suitably compacted and hardened, and a pair of sheet-metal disks provided with annular corrugations, said disks being provided at their periphery with inturned flanges having interlocking engagement with the interior surface of said annulus.

6. A gear comprising an annulus of hardened, consolidated fibrous material and a binder, a central bushing, and a rolled metal disk having folds therein and held under radial compression between said annulus and bushing, said disk being also provided peripherally with a flange having spaced slits therein.

ROBERT W. LYTLE.